United States Patent

Brueckmann et al.

Patent Number: 5,231,145
Date of Patent: Jul. 27, 1993

[54] COPOLYMERS BASED ON $C_1$-$C_8$-ALKYL ACRYLATES AND/OR METHACRYLATES AND THEIR USE IN SIZING AGENT COMPOSITIONS

[75] Inventors: Ralf Brueckmann, Goennheim; Holger Schoepke, Neckargemuend; Thomas Wirth; Juergen Hartmann, both of Ludwigshafen, all of Fed. Rep. of Germany

[73] Assignee: BASF Aktiengesellschaft, Ludwigshafen, Fed. Rep. of Germany

[21] Appl. No.: 679,275

[22] Filed: Apr. 2, 1991

[30] Foreign Application Priority Data

Apr. 2, 1990 [DE] Fed. Rep. of Germany ....... 4010563

[51] Int. Cl.$^5$ .............................. C08F 8/42; C08F 8/44
[52] U.S. Cl. ........................................ 525/369; 252/8.7; 525/378; 525/418; 525/451; 526/202; 526/210; 526/212; 526/319; 526/328; 526/328.5; 526/329.7; 526/318.4
[58] Field of Search .................... 525/369, 378; 526/328.5, 318.4

[56] References Cited

U.S. PATENT DOCUMENTS

| | | | |
|---|---|---|---|
| 3,546,008 | 12/1970 | Shields | 428/395 |
| 3,876,596 | 4/1975 | Grubert et al. | 260/89.5 |
| 3,909,477 | 9/1975 | Madison | 524/285 |
| 4,167,485 | 9/1979 | Schenk | 252/8.6 |
| 4,265,796 | 5/1981 | Mueller-Mall et al. | 524/733 |
| 4,397,968 | 8/1983 | Eck | 523/305 |
| 4,455,341 | 6/1984 | Harteman | 428/225 |
| 4,470,505 | 7/1987 | Craig | 524/704 |

FOREIGN PATENT DOCUMENTS

| | | |
|---|---|---|
| 144155 | 1/1984 | European Pat. Off. . |
| 1278813 | 6/1972 | United Kingdom . |
| 1438449 | 8/1974 | United Kingdom . |

Primary Examiner—Joseph L. Schofer
Assistant Examiner—Fred Zitomer
Attorney, Agent, or Firm—Oblon, Spivak, McClelland, Maier & Neustadt

[57] ABSTRACT

Copolymers suitable for use as temporary surface protection for two- or three-dimensional structures and as sizing agents are based on $C_1$-$C_8$-alkyl acrylates and/or methacrylates and are obtainable by free radical emulsion or solution polymerization of A) from 50 to 95% by weight of a $C_1$-$C_8$-alkyl acrylate or methacrylate, B) from 5 to 20% by weight of an unsaturated carboxylic acid or anhydride, C) from 0 to 20% by weight of further water-soluble comonomer, and D) from 0 to 10% by weight of other comonomer in the presence of E) from 2 to 60 parts by weight of a polyvinyl alcohol per 100 parts by weight of the monomer mixture of A) to D).

4 Claims, No Drawings

COPOLYMERS BASED ON $C_1$-$C_8$-ALKYL ACRYLATES AND/OR METHACRYLATES AND THEIR USE IN SIZING AGENT COMPOSITIONS

The present invention relates to copolymers based on $C_1$-$C_8$-alkyl acrylates and/or methacrylates and obtainable by free radical emulsion or solution polymerization of A) from 50 to 95% by weight of a $C_1$-$C_8$-alkyl acrylates or methacrylate, B) from 5 to 20% by weight of an unsaturated carboxylic acid or anhydride, C) from 0 to 20% by weight of further water-soluble comonomer, and D) from 0 to 10% by weight of other comonomer in the presence of E) from 2 to 60 parts by weight of a polyvinyl alcohol per 100 parts by weight of the monomer mixture of A) to D).

The present invention also relates to the copolymers when partially or completely neutralized with alkali metal, alkaline earth metal or ammonium salts, to a process for preparing said copolymers, to methods of using them for providing temporary surface protection for molded and sheetlike articles and as sizing agents for the processing of staple fiber and filament yarns, and also to these sizing agents in the form of compositions.

The present invention further relates to sizing agent compositions of the acrylate and/or methacrylate copolymers described, polyvinyl alcohol, customary additives and completely or partially neutralized, sulfo- and/or carboxyl-containing polyesters of nonaromatic $C_2$-$C_8$-diols and mixtures of aromatic dicarboxylic acids and aromatic tricarboxylic acids and/or sulfodicarboxylic acids which are water-soluble in salt form, and to the use of these sizing agent compositions for the processing of filament yarns.

Copolymers based on alkyl acrylates and/or methacrylates with minor amounts of further comonomers such as unsaturated carboxylic acids, for example acrylic acid, and prepared by emulsion polymerization in the presence of protective colloids such as polyvinyl alcohol are known from various publications.

In these copolymers, which are chiefly suitable for use as binders for emulsion paints and as adhesives, the proportion of unsaturated carboxylic acid is very low at not more than 5% (G 1 278 813) or at 1% (DE-A-3 111 602).

If the proportion of unsaturated carboxylic acid is high, on the other hand, the copolymers contain only very little polyvinyl alcohol as protective colloid at not more than 7% (U.S. Pat. No. 3,876,596), at not more than 5% (U.S. Pat. No. 4,670,505) or at not more than 2% (U.S. Pat. No. 4,265,796).

However, these copolyers are of only limited use for some purposes.

Ullmann, Vol. 23, p. 16 (1983), discloses copolymers based on acrylate and/or methacrylate copolyers for use as sizing agents.

However, the copolymers described cause an undesirable sticking together or blocking of the sized filament yarns and their viscosity increases greatly on neutralization.

It is an object of the present invention to provide new copolymers which can be used in particular as sizing agents.

We have fond that this object is achieved by the copolymers defined at the beginning, by a process for preparing these copolyers, and by the use thereof as agents for providing temporary surface protection and as sizing agents for the processing of staple fiber and filament yarns.

The present invention also provides sizing agent compositions of the acrylate and/or methacrylate copolymers described, polyvinyl alcohol, customary additives and completely or partially neutralized, sulfo- and/or carboxyl-containing polyesters of non-aromatic $C_2$-$C_6$-diols and mixtures of aromatic dicarboxylic acids and aromatic tricarboxylic acids and/or sulfodicarboxylic acids which are water-soluble in salt form.

The copolymers according to the present invention are prepared from 50–95% by weight, preferably 70–80% by weight, of a $C_1$-$C_8$-alkyl acrylate and/or methacrylate as component A and 5–20% by weight of an unsaturated carboxylic acid as component B in the presence of from 2 to 60 parts by weight, preferably from 10 to 40 parts by weight, of a polyvinyl alcohol, based on 100 parts by weight of A and B.

The copolymers according to the present invention may also contain up to 20% by weight of further water-soluble comonomers as component C and up to 10% by weight of other comonomers as component D.

Suitable components A are $C_1$-$C_8$-alkyl acrylates and methacrylates.

Particularly preferred components A are methyl and n-butyl acrylate and methyl and n-butyl methacrylate.

Preference is given to ethyl, n-propyl, isopropyl, isobutyl, sec-butyl, tert-butyl acrylates and methacrylates.

Other possibilities are n-pentyl, n-hexyl, 2-ethylhexyl, n-heptyl and n-octyl acrylates and methacrylates.

Suitable components B are unsaturated carboxylic acids, chiefly acrylic acid and methacrylic acid.

It is also possible to use crotonic acid, maleic acid, fumaric acid, itaconic acid and the anhydrides of unsaturated carboxylic acids.

Additional water-soluble comonomers suitable or use as component C are in particular acrylamide, methacrylamide, allyl alcohol and especially acrylonitrile and sodium vinylsulfonate.

The other comonomers suitable for use as component D are preferably aromatic vinyl compounds such as styrene, vinyl acetate, vinyl propionate and N-vinylpyrrolidone and the esters of unsaturated dicarboxylic acids such as the di-n-butyl ester of maleic acid.

The polyvinyl alcohol used as component E preferably has a degree of polymerization of from 200 to 2,000 and a degree of hydrolysis of from 75 to 99 mol %. The remaining 1–25 mol % are accounted for by the acetate or propionate groups of the polyvinyl acetate or propionate preferably used for preparing the polyvinyl alcohol.

To prepare a filament size, preference is given to polyvinyl alcohols having a degree of polymerization of 300 to 2,000 (corresponding to a standard viscosity of from 3 to 25 mPa.s) and a degree of hydrolysis of from 86 to 90 mol %.

The copolymers according to the present invention are prepared by free radical solution polymerization, but preferably by free radical emulsion polymerization in aqueous solution.

The initiators for the free radical polymerization reaction can be the customary peroxo or azo compounds, possibly combined with reducing agents, advantageously used in amounts of from 0.5 to 2.0% by weight, based on the weight of the monomers.

Preferred initiators are dibenzoyl peroxide, tert-butyl perpivalate, tert-butyl per-2-ethylhexanoate, di-tert-butyl peroxide, tert-butyl hydroperoxide, 2,5-dimethyl-2,5-di(tert-butylperoxy)hexane, cumene hydroperoxide and 4,4'-azobisisobutyronitrile.

Preferred reducing agents are hydrazine, sodium sulfite, sodium hydrogensulfite, potassium sulfite, potassium hydrogensulfite, ammonium sulfite and ammonium hydrogensulfite, which are used in amounts of from 0.005 to 2.0% by weight.

Preferred emulsifiers are anionic emulsifiers such as lauryl sulfate, p-n-nonylphenol, p-n-decylphenol, sodium stearate, potassium oleate in particular $C_{15}$-paraffinsulfonate. Suitable nonionic emulsifiers are in particular the ethoxylation products of lauryl alcohol, oleyl alcohol, stearyl alcohol, oleamide, stearamide, oleylamide, stearic acid or oleic acid having a degree of ethoxylation of from 3 to 20. It is also possible to use cationic emulsifiers such as ammonium, phosphonium and sulfonium compounds having at least one long aliphatic hydrocarbon chain as hydrophobic moiety.

In an emulsion polymerization, the all-important emulsifiers are used in amounts of from 0.1 to 2.0% by weight.

To control the molecular weight it is possible to add regulators. Use of a regulator is particular important in the presence of large amounts of polyvinyl alcohol, since otherwise highly viscous, non-fluent solutions are formed, which are of little use as sizing agents.

Preferred regulators are carbon tetrachloride, carbon tetrabromide, benzyl bromide, trichlorobromomethane and butylmercaptan, which in general are used in amounts of from 0.1 to 5% by weight.

Particularly good results are obtained with tert-dodecylmercaptan as regulator in amounts of from 0.2 to 1.0% by weight combined with from 1.0 to 1.5% by weight of a peroxo compound as initiator.

In general, the polymerization is carrie out at from 20° to 95° C., preferably at from 65° to 90° C.

Advantageously, the reaction is carried out at atmospheric pressure, but it can also be carried out under reduced or slightly superatmospheric pressure, i.e. within the range from 0.5 to 5 bar, say.

The reaction time is normally from 1 to 5, usually from 2 to 3, hours.

The emulsion feed process generally comprises heating an aqueous solution of some of the initiators, emulsifiers and regulators to the reaction temperature and feeding in the monomers in equal or varing portions, preferably continuously. It is also possible to introduce some of the monomers, preferably from 4 to 20% by weight, in the initial charge, to initiate the polymerization and to start metering in the bulk of the monomer mixture only after about 10–30 minutes.

The polyvinyl alcohol can be added at the same or a different time as the monomers, but preferably amounts up to 10% by weight are introduced in the initial aqueous solution. The remaining amounts of initiators, emulsifiers and regulators are added continuously or intermittently.

On completion of the feed, the polymerization is continued for about another hour to reduce the residual monomer contents, advantageously with the addition of further initiator.

To prepare the sizing agents, the copolymers are preferably converted at from 50 to 85° C. into their sodium, calcium, magnesium, ammonium or $C_1$–$C_4$-alkyl-ammonium salts. In general, the salt content is not less than 50%.

If the sizing agents are to be used for filament yarns, the aqueous latex is preferably treated with aqueous ammonia.

Staple fiber yarn sizes are preferably obtained by adding sodium hydroxide, sodium carbonate or sodium bicarbonate to the aqueous latex.

The solutions thus obtainable can be used directly or together with further components as sizing agents for polyester, cellulose acetate, polyamide, viscose, cotton, cotton/polyester, viscose/polyester and polyester/wool fibers.

Particularly highly suitable sizing agents are composed of a) from 20 to 60% by weight, preferably from 40 to 60% by weight, of a partially or completely neutralized acrylate and/or methacrylate copolymer of the type defined, b) from 10 to 40% by weight, preferably from 10 to 25% by weight, of a polyvinyl alcohol having a preferred degree of hydrolysis of from 85 to 90 mol %, c) from 20 to 60% by weight, preferably from 20 to 50% by weight, of a partially or completely neutralized, sulfo- and/or carboxyl-containing polyester from a nonaromatic $C_2$–$C_6$-diol and a mixture of an aromatic dicarboxylic acid and an aromatic tricarboxylic acid and/or sulfodicarboxylic acid and water-soluble in salt form, and d) from 0 to 10% by weight of customary additives.

The polyesters defined as component c) are known or obtainable by known methods (Ullman, Vol. 23, p. 17 (1983)).

They are obtained by condensing nonaromatic $C_2$–$C_6$-diols such as diethylene glycol or 1,4-hydroxymethylcyclohexane with a mixture of an aromatic dicarboxylic acid such as isophthalic acid or terephthalic acid and an aromatic tricarboxylic acid and/or sulfodicarboxylic acid such as trimellitic acid and/or sulfoisophthalic acid.

Preference is given to using polyesters having molecular weights of from 150,000 to 250,000 and an acid number of from 40 to 60 mg of potassium hydroxide per gram of polymer.

Suitable customary additives d are:

viscosity regulators such as perborates, hydrogen peroxide and urea;

size fats such as sulfated fats and oils and primary fatty alcohol sulfates;

wetting agents such as sulfonated oils, fatty alcohol sulfates and aromatic sulfonates;

antifoams such as amides or esters or fatty acids and silicones and preservatives such as copper sulfate, aluminum alum, boric acid, formaldehyde and benzoic acid.

It is also possible to include thickeners, pigments, crosslinkers, fillers, reinforcing agents, film formers and antioxidants.

The polymer mixtures according to the present invention are preferably prepared as 15–25% strength by weight solutions by adding together the acrylate and/or methacrylate copolymers, polyvinyl alcohol, polyesters and any customary additives.

The copolymers and polymer mixtures according to the present invention preferably have K values of from 25 to 120, particularly from 30 to 50. The desired K value can be obtained in a conventional manner through choice of the polymerization conditions, primarily the polymerization time and the initiator concentration.

The K values are measured by the method of Fikentscher, Cellulose-Chemie, 13 (1932), 58-64, at 25° C. in 0.5% strength by weight tetrahydrofuran solution, and they are a measure of the molecular weight.

The dispersions or solutions of the copolymers and polymer mixtures according to the present invention have solids contents of preferably 20-50% by weight, while the partially or completely neutralized dispersions or solutions preferably have solids contents of from 18 to 25% by weight.

The copolymers according to the present invention are chiefly used as sizing agents for the processing of staple fiber and filament yarns, while the polymer mixtures according to the present invention are preferably used as sizing agents for the processing of microfiber yarns and textured or smooth filament yarns.

They can also be used for conferring temporary surface protection on two-dimensional or three-dimensional structures, for example drawings, maps, prints, photographs or pictures.

They are also suitable for use as paper strength enhancers, print thickeners, textile finishes and adhesives.

The copolymers according to the present invention combine a good sizing effect with a high film hardness and hence a reduced blocking effect on the sized filament threads. Furthermore, they exhibit high adhesive strength values and also mixture stability and a low viscosity. A particular advantage of these copolymers is that they are easy to wash off before the further processing of the yarns.

The viscosities of the copolymers reported in the Examples, were determined in a Brookfield viscometer a 100 rpm at 20° C. on an aqueous solution at the concentration indicated for each Example.

EXAMPLES

The copolymers prepared in accordance with methods a) and b) by emulsion polymerization were obtained in the form of aqueous dispersions, which after addition of a base gave in each case a clear aqueous solution.

a) Preparation of Copolymers Chiefly Suitable for Use As Staple Fiber Yarn Sizing Agents Examples 1 to 5 were carried out using a polyvinyl alcohol (prepared by hydrolyzing polyvinyl acetate) having a degree of hydrolysis of 88 mol % and a degree of polymerization of 400 (corresponding to a standard viscosity of 4 mPa.s, measured at 20° C. on a 4% strength aqueous solution).

EXAMPLE 1

A solution of
842.5 g of water
0.36 g of a $C_{15}$-paraffinsulfonate
1.4 g of sodium vinylsulfonate
20 g of polyvinyl alcohol and
25.7 g of feed 2
were heated to 80° C. and then continuously admixed at 85° C. for 2-2.5 hours with feeds 1 and 2.
Feed 1
846.9 g of water
1.96 g of a $C_{15}$-paraffinsulfonate
0.6 g of sodium vinylsulfonate
70 g of methacrylic acid
280 g of n-butyl acrylate
115 g of methyl methacrylate -continued
35 g of acrylonitrile
Feed 2
250 g of water
7 g of sodium persulfate.

This was followed by 1 hour of polymerization, cooling down to 55° C. and neutralizing with 15% strength aqueous sodium hydroxide solution to pH 7.4.

The polymer content of the solution obtained was 20.6% by weight, and this solution had a viscosity of 2,450 mPa.s at 20° C.

EXAMPLE 2

This copolymer was prepared in the manner of Example 1 from the following initial charge and feeds 1 and 2:

600.5 g of water
0.36 g of a $C_{15}$-paraffinsulfonate
1.4 g of sodium vinylsulfonate
10 g of polyvinyl alcohol
25.7 g of feed 2
Feed 1
572.9 g of water
1.96 g of a $C_{15}$-paraffinsulfonate
0.6 g of sodium vinylsulfonate
2 g of tert-dodecylmercaptan
70 g of methacrylic acid
280 g of n-butyl acrylate
115 g of methyl methacrylate
35 g of acrylonitrile
Feed 2
250 g of water
7 g of sodium persulfate.

The polymer content of the solution obtained was 25.1% by weight, and this solution had a viscosity of 166 mPa.s at 20° C.

EXAMPLE 3

This copolymer was prepared in the manner of Example 1 from the following initial charge and feeds 1 and 2:

842 g of water
0.36 g of a $C_{15}$-paraffinsulfonate
1.4 g of sodium vinylsulfonate
20 g of polyvinyl alcohol
25.5 g of feed 2
Feed 1
839.9 g of water
1.96 g of a $C_{15}$-paraffinsulfonate
0.6 g of sodium vinylsulfonate
2 g of tert-dodecylmercaptan
70 g of methacrylic acid
280 g of n-butyl acrylate
115 g of methyl methacrylate
35 g of acrylonitrile
Feed 2
250 g of water
7 g of sodium persulfate.

The polymer content of the solution obtained was 21.7% by weight, and this solution had a viscosity of 298 mPa.s at 20° C.

EXAMPLE 4

This copolymer was prepared in the manner of Example 1 from the following initial charge and feeds 1 and 2:

| | |
|---|---|
| 832.5 | g of water |
| 0.36 | g of a C₁₅-paraffinsulfonate |
| 1.4 | g of sodium vinylsulfonate |
| 25.7 | g of feed 2 |
| | Feed 1 |
| 896.9 | g of water |
| 333.3 | g of a 30% strength aqueous solution of a polyvinyl alcohol |
| 1.96 | g of a C₁₅-paraffinsulfonate |
| 0.6 | g of sodium vinylsulfonate |
| 2 | g of tert-dodecylmercaptan |
| 70 | g of methacrylic acid |
| 280 | g of n-butyl acrylate |
| 115 | g of methyl methacrylate |
| 35 | g of acrylonitrile |
| | Feed 2 |
| 250 | g of water |
| 7 | g of sodium persulfate. |

The polymer content of the solution obtained was 20.3% by weight, and this solution had a viscosity of 1660 mPa.s at 20° C.

EXAMPLE 5

This copolymer was prepared in the manner of Example 1 from the following initial charge and feeds 1 and 2:

| | |
|---|---|
| 400.3 | g of water |
| 0.2 | g of a C₁₅-paraffinsulfonate |
| 0.8 | g of sodium vinylsulfonate |
| 25.4 | g of feed 2. |
| | Feed 1 |
| 661.7 | g of water |
| 500 | g of a 30% strength aqueous solution of a polyvinyl alcohol |
| 1.16 | g of a C₁₅-paraffinsulfonate |
| 0.4 | g of sodium vinylsulfonate |
| 1.2 | g of tert-dodecylmercaptan |
| 42 | g of methacrylic acid |
| 168 | g of n-butyl acrylate |
| 69 | g of methyl methacrylate |
| 21 | g of acrylonitrile |
| | Feed 2 |
| 250 | g of water |
| 4.2 | g of sodium persulfate. |

The polymer content of the solution obtained was 20.5% by weight, and this solution had a viscosity of 1640 mPa.s at 20° C.

Application Properties

The copolymers according to the present invention were tested in respect of their film properties and also, to measure their sizing effect, in respect of pilling and pseudo-warp yarn breakage.

A) Determination of Film Characteristics

To determine the film characteristics, mechanical properties such as elasticity and also homogeneity and toughness of films are tested.

First, films 2 mm in thickness were prepared from the polymer solutions of Examples 1 to 5. These films were then dried at 80° C. for 3 hours and thereafter maintained at 65% or 80% relative humidity and 20° C. for 24 hours.

B) Determination of the Sizing Effect through Determination of a) the pilling values and
b) the pseudo-warp yarn breakage values.

The sizing effect is tested on the Reutlingen weave tester which simulates the stress on warp yarns during weaving by subjecting sized yarns under a certain tension to a repeated mechanical stress by means of metal pins (J. Trauter and R. Vialon, Textil Praxis International 1985, 1201). The number of these stresses until a certain amount of damage to the yarn can be observed is a measure of the quality of the sizing agent.

The sizing effect is assessed in terms of
a) the pilling values and
b) the pseudo-warp yarn breakage values.

a) The pilling value is that value at which a certain yarn is observed to form a small pill.

b) The pseudo-warp yarn breakage value is that value at which a certain yarn loses its tension.

High pilling and pseudo-warp yarn breakage values indicate a good sizing effect.

To determine the sizing effect, yarns of 65:35 w/w polyester/cotton were sized at room temperature on a laboratory sizing machine (DE-C-2 714 897) with 15% strength liquors of the copolymers. Then the sized yarns were maintained at 68% relative humidity and 20° C. for 24 hours.

Table 1 shows the results of Tests A and B in respect of the film characteristics and the sizing effect. The copolymers 1 to 5 according to the present invention are completely tough, elastic and homogeneous and exhibit high pilling and pseudo-warp yarn breakage values.

TABLE 1

Application properties of copolymers according to Examples 1 to 5

| Sizing agent | Film characteristics | Sizing action | |
|---|---|---|---|
| | | Pilling | Pseudo-warp yarn breakage |
| according to Example 1 | tough, elastic, homogeneous | 4307 | 4728 |
| according to Example 2 | tough, elastic, homogeneous | 2593 | 4028 |
| according to Example 3 | tough, elastic, homogeneous | 2442 | 3944 |
| according to Example 4 | tough, elastic, homogeneous | 2055 | 3250 |
| according to Example 5 | tough, elastic, homogeneous | 2010 | 3041 |
| For comparison: commercial size* | tough, elastic, homogeneous | 683 | 2336 |

*copolymer of 65% of acrylic acid and 35% of acrylonitrile, ammonium salt b) Preparation of Copolymers Chiefly Suitable or Use as Filament Yarn Sizing Agents Examples 6 and 7 were carried out sign a polyvinyl alcohol (prepared by hydrolyzing polyvinyl acetate) having a degree of hydrolysis of 88 mol % and a degree of polymerization of 500 (corresponding to a standard viscosity of 5 mPa.s, measured at 20° C. on a 4% strength aqueous solution).

EXAMPLE 6

This copolymer was prepared in the manner of Example 1 from the following initial charge and feeds 1 and 2, except that it was neutralized with 25% strength aqueous ammonia.

| | |
|---|---|
| 873.5 | g of water |
| 0.36 | g of a C₁₅-paraffinsulfonate |
| 1.4 | g of sodium vinylsulfonate |
| 25.7 | g of feed 2 |

-continued

| Feed 1 |
|---|
| 738.9 g of water |
| 475 g of a 20% strength aqueous solution of a polyvinyl alcohol |
| 1.96 g of a C$_{15}$-paraffinsulfonate |
| 0.6 g of sodium vinylsulfonate |
| 70 g of methacrylic acid |
| 250 g of n-butyl acrylate |
| 25 g of n-butyl methacrylate |
| 120 g of methyl methacrylate |
| 15 g of styrene |
| 20 g of acrylonitrile |
| Feed 2 |
| 250 g of water |
| 7 g of sodium persulfate. |

The polymer content of the solution obtained was 20.7% by weight, and this solution had a viscosity of 1800 mPa.s at 20° C.

EXAMPLE 7

This copolymer was prepared in the manner of Example 6 from the following initial charge and feeds 1 and 2:

| |
|---|
| 873.5 g of water |
| 0.36 g of a C$_{15}$-paraffinsulfonate |
| 1.4 g of sodium sulfonate |
| 25.7 g of feed 2 |
| Feed 1 |
| 945.9 g of water |
| 166.6 g of a 30% strength aqueous solution of a polyvinyl alcohol |
| 1.96 g of a C$_{15}$-paraffinsulfonate |
| 0.6 g of sodium vinylsulfonate |
| 2 g of tert-dodecylmercaptan |
| 70 g of methacrylic acid |
| 280 g of n-butyl acrylate |
| 115 g of methyl methacrylate |
| 35 g of acrylonitrile |
| Feed 2 |
| 250 g of water |
| 7 g of sodium persulfate. |

The polymer content of the solution obtained was 19.6% by weight, and this solution had a viscosity of 152 mPa.s at 20° C.

Application Properties

The copolymers according to the present invention were tested in respect of yarn cohesion and blocking.

A) Determination of Yarn Cohesion

Yarn cohesion is a measure of the quality of a size in respect of the protection and stabilization it confers on the yarn. It is determined with a Shirley filament counter by cutting the filament yarn before and after sizing and determining the number of free, separate individual filaments from the number of pulses counted during the cut.

The unsized yarn has a MANRA value of 100, meaning that 100% of individual filaments are separate. The lower the MANRA value, the higher the number of individual filaments joined together at the point where the cut was made and the better the yarn cohesion and also the interfilament adhesion and hence the attainable weaving efficiency.

The yarn cohesion was tested using smooth 50-dtex 18-filament polyester yarns with a 6% size addon, which were measured with the Shirley filament counter not only directly (MANRA value MO in Table 2) but also after 200 stress cycles on the Reutlingen weave tester (MANRA value M200 in Table 2).

Good adhesive strength values and good yarn cohesion are indicated by M200 values below 50 and a very small difference between the MO and the M200 value.

B) Determination of Blocking Tendency

Blocking is the undesirable sticking together of sized filament yarns.

To determine the blocking tendency, sized filament bundles with a size addon of 6–7% by weight were placed between two glass plates 5×5 cm in size with a 1 kg weight on top and kept in that state at 65% relative humidity and 21° C. for 3 days.

Table 2 shows the results of Tests A and B and also the proportion of polyvinyl alcohol in the copolymers of Examples 6 and 7.

Copolymers 6 and 7 according to the present invention show good yarn cohesion without any blocking tendency.

TABLE 2

Application properties of the copolymers of Examples 6 and 7

| Sizing agent | PVA [%] | Yarn cohesion MO | Yarn cohesion M200 | Blocking |
|---|---|---|---|---|
| according to Example 6 | 19 | 20 | 29 | no |
| according to Example 7 | 10 | 15 | 33 | no |

C) Preparation of Polymer Mixtures Chiefly Suitable for Use as Filament Yarn Sizing Agents Individual Component A This component was prepared in the manner of Example 6 from the following initial charge and feeds 1 and 2:

| |
|---|
| 734.5 g of water |
| 0.36 g of a C$_{15}$-paraffinsulfonate |
| 1.4 g of sodium vinylsulfonate |
| 10.0 g of polyvinyl alcohol |
| 107.8 g of feed 1 |
| Feed 1 |
| 572.9 g of water |
| 1.96 g of a C$_{15}$-paraffinsulfonate |
| 0.6 g of sodium vinylsulfonate |
| 2.0 g of tert-dodecylmercaptan |
| 70.0 g of methacrylic acid |
| 280.0 g of n-butyl acrylate |
| 115.0 g of methyl methacrylate |
| 35.0 g of acrylonitrile |
| Feed 2 |
| 250 g of water |
| 7.0 g of sodium persulfate. |

The polymer content of the solution obtained was 24.2% by weight, and this solution had a viscosity of 110 mPa.s at 20° C.

Individual component B

This component was prepared in the manner of Example 6 from the following initial charge and feeds 1 and 2:

| |
|---|
| 873.5 g of water |
| 0.36 g of a C$_{15}$-paraffinsulfonate |
| 1.4 g of sodium vinylsulfonate |

-continued

| | |
|---|---|
| 20 g | of polyvinyl alcohol |
| 138.1 g | of feed 2 |

Feed 1

| | |
|---|---|
| 875.9 g | of water |
| 1.96 g | of a C$_{15}$-paraffinsulfonate |
| 0.6 g | of sodium vinylsulfonate |
| 2 g | of tert-dodecylmercaptan |
| 280 g | of n-butyl acrylate |
| 115 g | of methyl methacrylate |
| 35 g | of acrylonitrile |
| 70 g | of methacrylic acid |

Feed 2

| | |
|---|---|
| 250 g | of water |
| 7 g | of sodium persulfate. |

The polymer content of the solution obtained was 20.1% by weight, and this solution had a viscosity of 128 mPa.s at 20° C.

Individual Component C

This component was prepared in the manner of Example 6 from the following initial charge and feeds 1 and 2:

| | |
|---|---|
| 873.5 g | of water |
| 0.36 g | of a C$_{15}$-paraffinsulfonate |
| 1.4 g | of sodium vinylsulfonate |
| 161.7 g | of feed 1 |

Feed 1

| | |
|---|---|
| 945.9 g | of water |
| 166.6 g | of a 30% strength aqueous solution of a polyvinyl alcohol |
| 1.96 g | of a C$_{15}$-paraffinsulfonate |
| 0.6 g | of sodium vinylsulfonate |
| 2 g | of tert-dodecylmercaptan |
| 280 g | of n-butyl acrylate |
| 115 g | of methyl methacrylate |
| 35 g | of acrylonitrile |
| 70 g | of methacrylic acid |

Feed 2

| | |
|---|---|
| 250 g | of water |
| 7 g | of sodium persulfate. |

The polymer content of the solution obtained was 19.6% by weight, and this solution had a viscosity of 152 mPa.s at 20° C.

Individual Component D

This component was prepared in the manner of Example 6 from the following initial charge and feeds 1 and 2:

| | |
|---|---|
| 873.5 g | of water |
| 0.36 g | of a C$_{15}$-paraffinsulfonate |
| 1.4 g | of sodium vinylsulfonate |
| 174.7 g | of feed 1 |

Feed 1

| | |
|---|---|
| 768.9 g | of water |
| 475 g | of a 20% strength aqueous solution of a polyvinyl alcohol |
| 1.96 g | of a C$_{15}$-paraffinsulfonate |
| 0.6 g | of sodium vinylsulfonate |
| 2 g | of tert-dodecylmercaptan |
| 280 g | of butyl acrylate |
| 115 g | of methyl methacrylate |
| 35 g | of acrylonitrile |
| 70 g | of methacrylic acid |

Feed 2

| | |
|---|---|
| 250 g | of water |
| 7 g | of sodium persulfate. |

The polymer content of the solution obtained was 20.4% by weight, and this solution had a viscosity of 1620 mPa.s at 20° C.

Individual Component E

This component was prepared in the manner of Example 6 from the following initial charge and feeds 1 and 2:

| | |
|---|---|
| 873.5 g | of water |
| 0.36 g | of a C$_{15}$-paraffinsulfonate |
| 1.4 g | of sodium vinylsulfonate |
| 190 g | of feed 1 |

Feed 1

| | |
|---|---|
| 770.9 g | of water |
| 625 g | of a 20% strength aqueous solution of a polyvinyl alcohol |
| 1.96 g | of a C$_{15}$-paraffinsulfonate |
| 0.6 g | of sodium vinylsulfonate |
| 2 g | of tert-dodecylmercaptan |
| 280 g | of n-butyl acrylate |
| 115 g | of methyl methacrylate |
| 35 g | of acrylonitrile |
| 70 g | of methacrylic acid |

Feed 2

| | |
|---|---|
| 768 g | of water |
| 7 g | of sodium persulfate. |

The polymer content of the solution obtained was 20.6% by weight, and this solution had a viscosity of 1400 mPa.s at 20° C.

Individual Component F

This polyester with —COOH groups was prepared by condensation of

| | |
|---|---|
| 1 mol | of diethylene glycol, |
| 0.54 mol | of cyclohexane dimethanol (1,4-hydroxymethyl-cyclohexane), |
| 1.12 mol | of isophthalic acid, |
| 0.2 mol | terephthalic acid and |
| 0.23 mol | of trimellitic anhydride. |

It was neutralized with 6:4 ammonia/triethanolamine.

Individual Component G

This polyester with —SO$_3$H groups was prepared b condensation of

| | |
|---|---|
| 0.86 mol | of diethylene glycol |
| 0.2 mol | of cyclohexane dimethanol (1,4-hydroxymethyl-cyclohexane) |
| 0.23 mol | of isophthalic acid, |
| 0.70 mol | of terephthalic acid and |
| 0.13 mol | of sulfoisophthalic acid. |

It was neutralized with sodium salt up to a pH of 5.6.

EXAMPLES 8 TO 11

The polymer mixtures 8 to 11 according to the present invention were prepared at room temperature from
  a size solution of one of the individual components C to E
  polyvinyl alcohol and water and
  a polyester size solution of one of the individual components F or G
in such a ratio as to produce an approximately 20% strength by weight mixture having a polymer content comprising 21% of polyvinyl alcohol as sum total of the polyvinyl alcohol content of the individual component and the separately added polyvinyl alcohol 50% of acrylate/methacrylate copolymer and 29% of polyester.

The usefulness of the polymer mixtures according to the present invention was measured by determining the yarn cohesion.

Table 3 shows the results of this test and also the chemical compositions of polymer mixtures 8 to 11. For comparison, the corresponding individual components are shown as Examples C and G. Pure polyvinyl alcohol is also included as a comparison.

The polymer mixtures 8 to 11 according to the present invention exhibit better yarn cohesion or adhesive strength values and better abrasion resistance than the corresponding individual components.

TABLE 3

Adhesive strength of polymer mixtures 8 to 11 according to the present invention compared with the corresponding individual components

| Example | Chemical composition | Yarn cohesion M0 | Yarn cohesion M200 |
|---|---|---|---|
| C | Acrylate/methacrylate, 10% by weight of PVA | 15 | 33 |
| D | Acrylate/methacrylate, 19% by weight of PVA | 12 | 16 |
| E | Acrylate/methacrylate, 25% by weight of PVA | 13 | 36 |
| F | Polyester with carboxyl groups | 18 | 41 |
| G | Polyester with sulfo groups | 15 | 18 |
| 8 | Polymer mixture with C and F | 13 | 21 |
| 9 | Polymer mixture with D and F | 10 | 13 |
| 10 | Polymer mixture with E and F | 10 | 22 |
| 11 | Polymer mixture with D and G | 15 | 25 |
| PVA (88/5) | Polyvinyl alcohol (from polyvinyl acetate) hydrolyzed 88%, viscosity (4% in water, 20° C.) 5 mPa.s | 32 | >90 |

For comparison with the polymer mixtures according to the present invention, mixtures were prepared with one of the individual components A and B, polyvinyl alcohol and water and also the individual component F. Table 4 shows the results of determining the stability and viscosity of the polymer mixtures 8, 9 and 10 according to the present invention.

Polymer mixtures 8 to 10 according to the present invention are stable, unlike the mixtures prepared with the individual components A or B.

TABLE 4

Stability and viscosity of polymer mixtures 8 to 10 according to the present invention compared with mixtures of individual components having a low polyvinyl alcohol content

| Acrylate/methacrylate copolymer used Example | PVA content [%] | Stability of mixture | Viscosity of 15% strength liquor |
|---|---|---|---|
| A | 2 | Separation after 4 days | 70/50 |
| B | 4 | Separation after 4 days | 80/50 |
| C | 10 | No separation | 120/110 |
| D | 19 | No separation | 235/275 |
| E | 25 | No separation | 215/225 |

We claim:

1. A sizing agent composition composed of
   a) from 20 to 60% of a copolymer based on a $C_1$–$C_8$-alkyl acrylate or methacrylate, obtained by free radical emulsion or solution polymerization of
      A) from 50 to 95% by weight of a $C_1$–$C_8$-alkyl acrylate or methacrylate,
      B) from 5 to 20% by weight of an unsaturated carboxylic acid or anhydride,
      C) from 0 to 20% by weight of a water-soluble comonomer, and
      D) from 0 to 10% by weight of other comonomer in the presence of
      E) from 2 to 60 parts by weight of a polyvinyl alcohol per 100 parts by weight of the monomer mixture of A) to D), said copolymer being completely or partially neutralized with an alkali metal salt or hydroxide or ammonium hydroxide,
   b) from 10 to 40% by weight of a polyvinyl alcohol,
   c) from 20 to 60% by weight of a completely or partially neutralized, sulfo- or carboxyl-containing polyester which is formed from a nonaromatic $C_2$–$C$-diol and a mixture of an aromatic dicarboxylic acid and an aromatic tricarboxylic or sulfodicarboxylic acid and is water-soluble in salt form, ad
   d) from 0 to 10% by weight of additives.

2. The sizing agent composition of claim 1, wherein
   a) is form 40 to 60%,
   b) is from 10 to 25%, and
   c) is from 20 to 50%.

3. The sizing agent composition of claim 1, wherein
   A) is from 70 to 80% by weight,
   B) is from 5 to 20% by weight, and
   E) is from 10 to 40 parts by weight.

4. The sizing agent composition of claim 1, wherein the complete or partial neutralization is with a sodium salt or hydroxide or ammonium hydroxide.

* * * * *